W. LUMLEY.
STREET CAR.
APPLICATION FILED NOV. 1, 1909.
956,774.
Patented May 3, 1910.
2 SHEETS—SHEET 1.
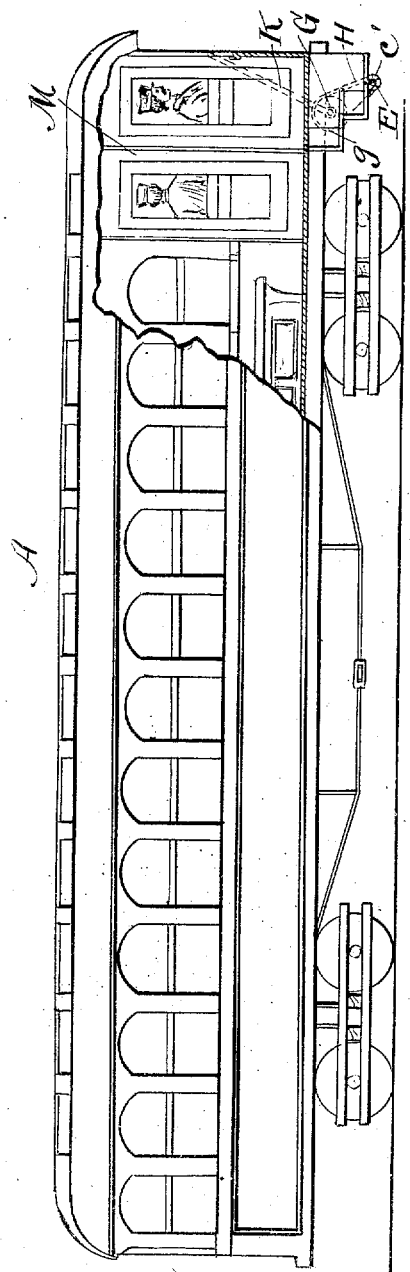

W. LUMLEY.
STREET CAR.
APPLICATION FILED NOV. 1, 1909.
956,774.
Patented May 3, 1910.
2 SHEETS—SHEET 2.
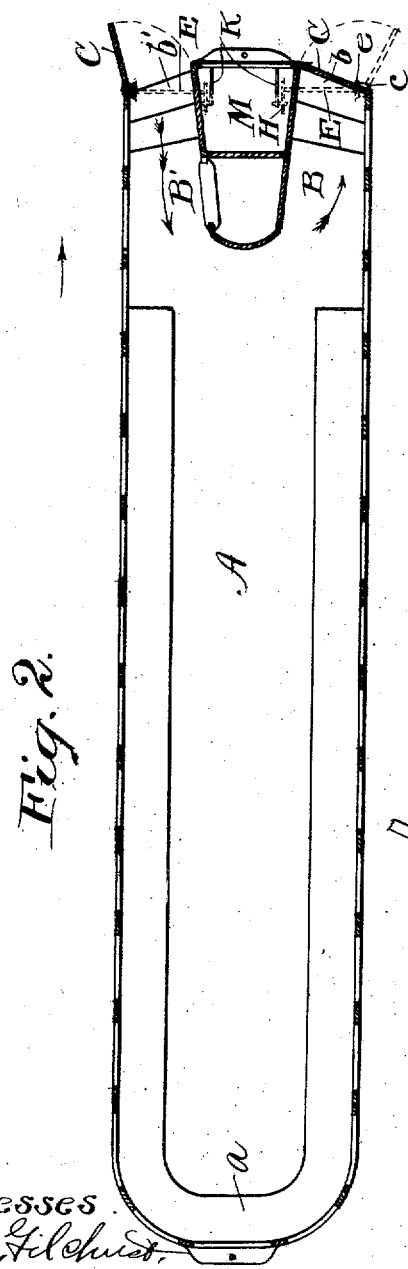
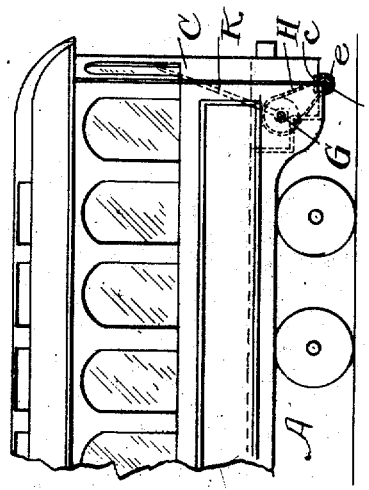
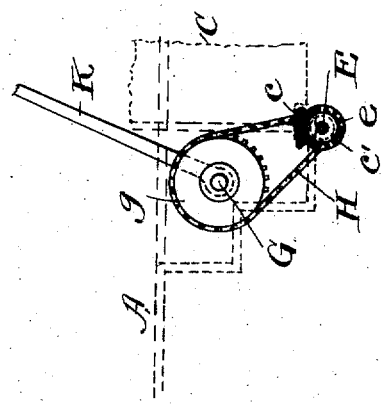
Witnesses
E. B. Gilchrist.
H. P. Sullivan.
Inventor.
Wilfrid Lumley
By Thurston Woodward
Attorneys

UNITED STATES PATENT OFFICE.

WILFRID LUMLEY, OF CONNEAUT, OHIO.

STREET-CAR.

956,774.

Specification of Letters Patent. Patented May 3, 1910.

Application filed November 1, 1909. Serial No. 525,607.

*To all whom it may concern:*

Be it known that I, WILFRID LUMLEY, a citizen of the United States, residing at Conneaut, in the county of Ashtabula and State of Ohio, have invented a certain new and useful Improvement in Street-Cars, of which the following is a full, clear, and exact description.

This invention pertains to passenger cars especially adapted for use on street railways in city streets; the object being to provide a car having great seating capacity for its size, and a car into and from which passengers may go quickly and with a minimum danger to themselves.

In the drawing, Figure 1 is a side view with the inner side of the car at the front end thereof broken away. Fig. 2 is a sectional plan view of the car. Fig. 3 is a side elevation of the front end of the car with the door closed and Fig. 4 is a detail view of suitable mechanism operable from the motorman's vestibule for opening and closing the car doors.

The car A has no rear platform, and no front platform in the ordinary sense of that term. The space usually occupied in a car by the rear platform is available for seats $a$ for the passengers. At the front end of the car is a vestibule M, preferably glass inclosed, for the motorman. This vestibule is considerably narrower than the car, wherefor within the car are the passageways B B' leading to two door openings $b$ $b'$ in the front end of the car. The vestibule is shown placed midway between the two sides of the car, wherefore the passageways are on opposite sides of the vestibule. This arrangement is believed to be much better than any other, but is not absolutely essential to the invention broadly defined. These openings are closed by doors C C which, when closed, prevent the passengers from entering or leaving the car. These doors are to be capable of being opened and closed only by mechanism accessible in the vestibule. In the specific construction shown, which, however, is not an essential feature of the primary invention, each door is hinged to the side of the car. To the lower end of each door a beveled gear $c$ is attached so as to be concentric with the hinge axis,—which gear is engaged by a beveled gear $e$ on a shaft E mounted in bearings below the car floor and extending crosswise of the car. Another shaft G is mounted below the car floor, and carries a large sprocket wheel $g$. A chain belt H going around sprocket wheel $g$ goes also around a smaller sprocket $c'$ attached to shaft E. A lever K fixed to each of the two shafts G passes up through a slot in the floor of the vestibule where they can be operated by the motorman.

The steps at the front end of the two passageways are within the car, and the doors are of such length that when closed they close in these steps. With this construction the steps are protected from the weather, and do not project beyond the front end of the car.

The conductor, or more properly with this car the cashier, stands in a space behind the vestibule and between the two passageways, where, when he is not collecting fares from the incoming passengers, he can look the length of the car and see whether any passengers wish to signal to get off. This cashier's space should be inclosed on its right and rear sides as shown in the drawing, so as to keep passengers out of the cashier's space.

It is intended that, in use, this car shall be stopped just before reaching the first cross walk of street intersections. The incoming passengers pass in front of the car on the cross walk and enter the door in the front end of the car at the motorman's left. They do not have to pass to the side of the car and so be in any danger of getting in front of a car on the other track. The outgoing passengers leave through the door at the right of the motorman, stepping down in front of the car onto the cross walk.

The motorman will be charged with the duty of noting when the passengers have gotten on the car or off and the front of the car is clear; and this duty he can easily perform because of the glass front and sides of his vestibule. When the passengers have gotten on or off, or both, he closes the doors and can then start his car without any signal from the conductor. The incoming passengers enter the car, as stated, through the door at the left of the motorman and pass down the left passageway and as they go by the cashier pay their fares to him or deposit them in a fare box standing beside him.

Another advantage of this construction contributing to the safety of passengers is that there is no chance that they will either attempt to get on or off the car while in motion because their only means of ingress or egress is through the front end. There is no chance that the car shall be started at a time when neither the conductor nor motorman can see whether people are getting on or off the car as, for example, with the cars in common use, when the conductor is in the car and collecting fares, and people are trying to get off or on at the rear end. There is no danger that the car shall be unduly delayed, as it sometimes is when the conductor is in the car, and dares not give the signal to start until perfectly sure that no one is trying to get on or off at the rear end.

Having described my invention, I claim:—

1. A passenger car having at its front end a motorman's vestibule, and an opening through the front end only of the car for the ingress and egress of passengers, and means operable from the motorman's vestibule for closing said opening.

2. A passenger car devoid of a rear platform and having at its front end a glass-inclosed vestibule narrower than the car whereby passageways are left on each side of the vestibule between the sides of the car, two openings in the front ends of the car at the ends of said passageways.

3. A passenger car devoid of a rear platform and having at its front end a glass-inclosed vestibule narrower than the car whereby passageways are left on each side of the vestibule between the sides of the car, two openings in the front ends of the car at the ends of said passageways, doors for closing said openings, and mechanism operable only from the vestibule for opening and closing said doors.

4. A passenger car devoid of a rear platform and having at its front end a glass-inclosed vestibule narrower than the car whereby passageways are left on each side of the vestibule between the sides of the car, two openings in the front ends of the car at the ends of said passageways, there being an inclosed space behind said vestibule and between said passageways for the cashier.

In testimony whereof, I hereunto affix my signature in the presence of two witnesses.

WILFRID IMLEY.

Witnesses:
E. L. THURSTON,
H. R. SULLIVAN.